July 28, 1931. R. LEE 1,816,050
ATTRITION MILL
Filed April 8, 1927
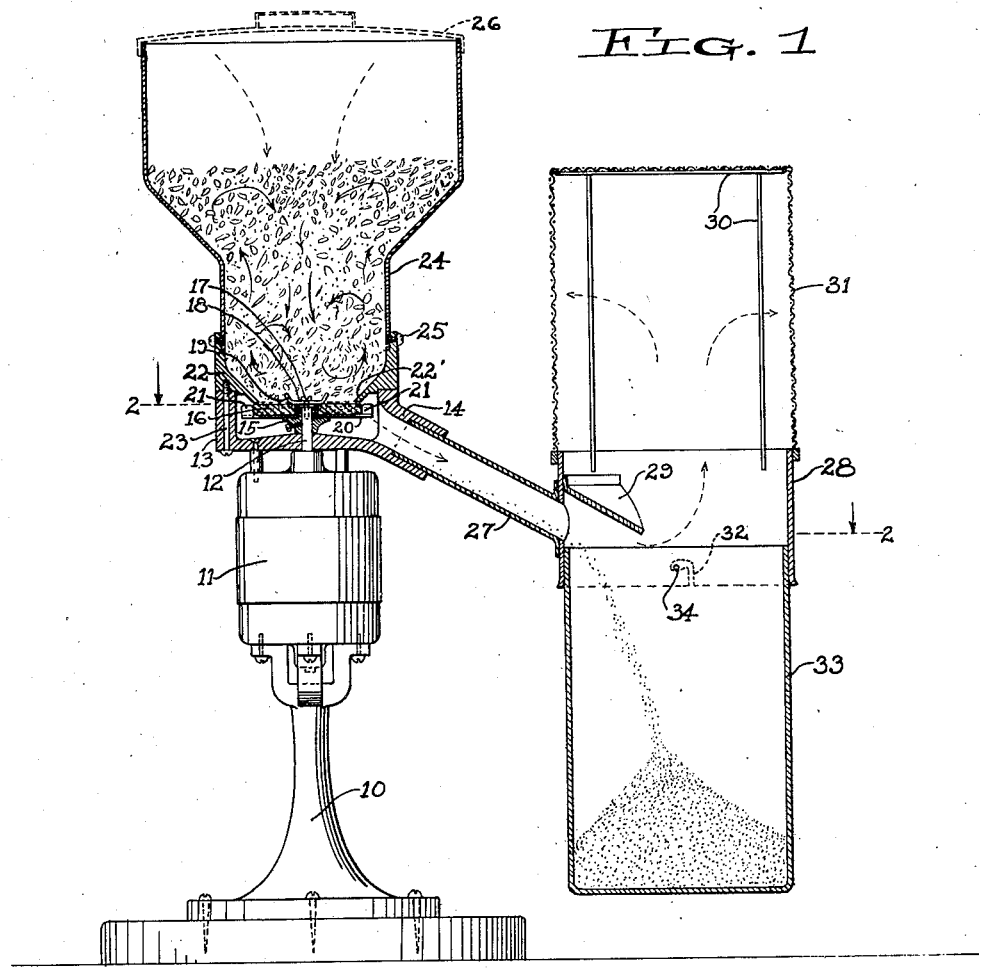
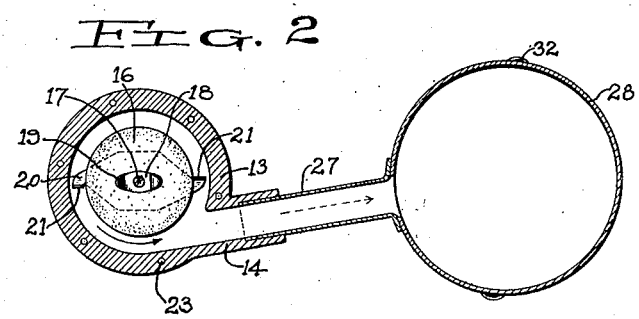
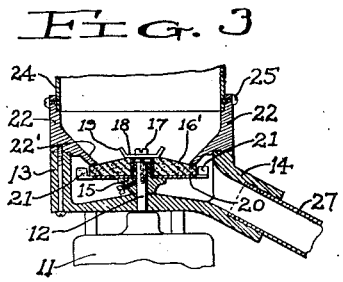
WITNESSES
INVENTOR
Royal Lee
By R. S. Caldwell
ATTORNEY Patented July 28, 1931

1,816,050

UNITED STATES PATENT OFFICE

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN

ATTRITION MILL

Application filed April 8, 1927. Serial No. 182,055.

The invention relates to attrition mills and more particularly to those employed for the milling of flour.

Graham or whole wheat flour as produced from the entire wheat berry is recognized to possess a dietetic value greatly superior to that of ordinary white flour, but has the disadvantage that it does not keep well. Because of its lack of keeping qualities, graham or whole wheat flour is not generally available on the market except in communities where a substantial demand exists for it. In order to furnish a substitute with good keeping qualities, bran has been included in ordinary white flour to form a product resembling whole wheat flour, but such type of bran-content flour does not contain all the valuable substances present in the wheat berry. A disadvantage met with in this type of bran-content flour and in commercial grades of true whole wheat flour is that the bran is not milled fine enough to permit uniformly good bread making, the rising of the dough being interfered with and the bread being of coarse, loose texture.

It is an object of the present invention to provide a flour mill suitable for ownership and operation by individual users and capable of grinding or milling whole wheat flour in quantities sufficient for immediate use, so that freshly prepared whole wheat flour may be available in homes, hotels, restaurants, bakeries, groceries and other places.

Another object of the invention is to provide a flour mill capable of pulverizing all the parts of whole grains to flour of a substantially uniform degree of fineness for permitting the making of bread and other bakery of good texture.

A further object is to provide a flour mill including a rotary abrasive member adapted to act on a superposed column of grain, the head of the grain furnishing the necessary grinding pressure.

A further object is to provide a mill of this character in which means are provided for agitation and circulation of the grain above the rotary abrasive member.

A further object is to provide a mill of this character including fan means for assisting the discharge of the newly ground flour and for cooling and drying the flour.

A further object is to provide a mill including a pair of relatively rotatable members presenting a narrow annular opening through which the comminuted material is discharged.

A further object is to provide a mill including a flour collecting receptacle into which flour is pneumatically conveyed, suitable screening means being provided for permitting the escape of the flour-conveying air currents but preventing the loss of flour.

In the accompanying drawings, Fig. 1 is a sectional elevation through a flour mill embodying the invention;

Fig. 2 is a sectional view thereof, taken on the line 2—2 of Fig. 1; and

Fig. 3 is a fragmentary sectional elevation of a slightly modified form of mill.

In these drawings, the numeral 10 designates a pedestal on which is mounted a high speed electric motor 11 having its upwardly projecting armature shaft 12 disposed to rotate on a substantially vertical axis. A cup-shaped casing 13 is mounted above the motor 11 to centrally receive therein the upper end portion of the armature shaft 12, and is provided with a tangential discharge nozzle 14 inclined downwardly.

A shouldered collar 15 is secured on the upper end of the shaft 12 to rotate therewith, and a disk-like abrasive wheel 16 having a bushed central aperture is mounted on the collar 15 and secured thereon against relative rotation by a screw 17 which enters axially into the end portion of the shaft. The screw 17 also secures in place to the upper face of the abrasive wheel a washer-forming agitator 18, which in the present instance consists of an elongated oval-shaped metal plate having its opposite end portions bent up to form inclined agitator wings 19. A fan 20 is clamped between the underface of the abrasive wheel and the shouldered collar 15 and comprises an elongated sheet metal plate of a length greater than the diameter of the abrasive wheel and having terminal portions bent up to form radial vanes or blades 21 lying adjacent the periphery of the abrasive wheel.

The abrasive wheel 16 in Fig. 1 is shown to have a plane upper surface, while in the modification shown in Fig. 3 the corresponding abrasive wheel 16' is provided with a conical upper surface. In either case the grinding wheel is one of medium texture and should not readily shed abrasive material.

The cup-shaped casing 13 which houses the abrasive wheel 16 is surmounted by an annular casing member 22 secured thereto by screws 23 and provided with a conical flange 22' projecting inwardly and downwardly to a region adjacent the upper surface of the abrasive wheel 16 and near the periphery of the wheel. The lower edge of the flange 22' is spaced from the wheel with small clearance to present a narrow annular orifice through which the newly-ground flour is outwardly discharged, as hereinafter described. A grain hopper 24 is secured to the upper end of the annular casing member 22, as by screws 25, the upper portion of the hopper 24 being enlarged to provide additional grain space, and surmounted, if desired, by a removable cover 26.

The nozzle 14 which projects tangentially from the cup-shaped casing 13 has secured therein a tubular conduit 27, the outer and lower end of which supports and opens into a container-suspending collar 28 disposed on a substantially vertical axis and provided with a deflector 29 above the discharge opening of the conduit. A wire frame-work 30 projects upwardly from the collar 28 and supports a porous cloth hood or screen 31 which is fastened at its lower edge about the upper end of the collar. The collar 28 is open at its lower end and is provided with bayonet slots 32. A cylindrical container 33 is adapted to be inserted upwardly into the lower end of the collar 28 and is provided with pins 34 to enter the bayonet slots 32 for suspending the container from the collar.

In operation, a quantity of wheat is placed in the hopper 24 and the motor 11 is started in operation. The abrasive wheel 16 is driven by the motor at a suitable high speed and abrades the adjacent wheat kernels to fine flour, which is discharged through the narrow annular opening presented between the upper surface of the abrasive wheel and the lower edge of the conical flange 22'. During the rotation of the abrasive wheel, the agitator 18 mounted thereon produces a circulation of the column of wheat in the direction indicated by the solid line arrows in Fig. 1, namely, downwardly at the central portion of the hopper and upwardly along the sides of the hopper. The effect of agitation is to keep the wheat kernels rolling about, so that they will grind down to a globular form rather than flat, thereby keeping the grinding surface of the abrasive wheel in a clean and effective condition and also insuring the fineness of the discharged flour. The head of the column of wheat in the hopper furnishes the necessary grinding pressure and the enlarged upper portion of the hopper provides grain capacity without much change in the head of grain as grinding proceeds. The effect of the agitator is to create a void immediately above the central portion of the abrasive disk so that air which filters down through the head of grain will have proper access to the abrasive surface of the wheel. The air in its outward movement along the wheel will act to promptly remove the newly-ground flour from the wheel and keep the wheel in effective cutting condition.

The fan 20 rotating with the abrasive wheel 16 acts as a suction fan to draw air downwardly through the column of wheat in the hopper 24 and outwardly through the annular opening between the abrasive wheel and the conical flange 22', thereby assisting the discharge of the newly-ground flour into the fan chamber and also cooling and drying the flour. At the same time, the action of the fan is such as to blow the flour outwardly into the tangential nozzle 14, down the tubular conduit 27, and into the container 33 held in the collar 28. The air which blows the flour into the container then escapes upwardly through the porous cloth hood or cap 31. By removing the flour from the grinding surface of the abrasive wheel as fast as it is produced, the wheel is kept in proper condition for effective grinding and packing is avoided. The grinding action upon the wheat kernels is such that the bran is comminuted to a degree of fineness substantially equal to that of the rest of the flour, thereby facilitating rising of dough containing the flour and improving the texture of bread and other bakery made from the flour. With the usual methods of milling whole wheat and other bran-content flours, the bran is commonly left in a somewhat flaky condition which prevents proper rising of the dough and results in a coarse, loose texture of the bread.

The clearance between the lower edge of the conical flange 22' and the upper surface of the abrasive wheel 16 determines the fineness of the flour, although practically all of the flour particles are somewhat smaller in diameter than the actual clearance. This clearance can be adjusted by providing shims between the cup-shaped casing 13 and the superposed annular casing member 22, or by axially displacing the armature shaft 12 in any suitable manner, which will accomplish the same result.

The invention provides a flour mill which is capable of milling fine whole grain flour in quantities sufficient for immediate use, and which, by reason of its simple and compact construction, is well suited for ownership and operation by individual users.

What I claim as new and desire to secure by Letters Patent is:

1. An attrition mill comprising a rotary flour-producing abrasive member, and a receptacle forming with said rotary abrasive member a chamber receiving grains of material to be ground, there being a continuous constricted slit-like orifice between said rotary abrasive member and the adjacent receptacle for discharge of floured material, said orifice being of substantially uniform width throughout its length.

2. An attrition mill comprising a rotary member having a flour producing abrasive surface, a receptacle forming with said rotary member a chamber receiving particles of material to be ground, there being a constricted orifice adjacent said rotary member for discharge of comminuted material, and rotary means distinct from said rotary abrasive member for agitating the particles of material in said receptacle to prevent flat localized grinding of said particles, said rotary means being disposed adjacent the upper face of said rotary member.

3. An attrition mill comprising a flour-producing abrasive wheel, a receptacle forming with said wheel a chamber receiving grains of material to be ground, there being a constricted orifice adjacent said wheel for discharge of floured material, a casing enclosing said wheel and having a tangential discharge opening, and a fan in said casing rotatable with said abrasive wheel for assisting the discharge of floured material through said orifice and for urging said floured material outwardly through said tangential opening.

4. An attrition mill comprising a rotary member having a disk-like abrasive surface, a receptacle forming with said rotary member a chamber receiving particles of material to be ground, and a centrally disposed agitator rotatable with said rotary member for preventing flat localized grinding of the particles of material in said receptacle.

5. An attrition mill comprising a rotary member having a disk-like abrasive surface, a superposed receptacle forming with said rotary member a chamber receiving particles of material to be ground, and a winged agitator carried at the central portion of said rotary member to rotate therewith for preventing flat localized grinding of the particles of material in said receptacle.

6. A flour mill comprising a rotary member having a flour-producing abrasive surface, a receptacle forming with said rotary member a chamber receiving particles of material to be ground, means for discharging floured material from said rotary member, and rotary agitating means disposed at the central portion of said rotary member for agitating the particles of material adjacent said rotary member and for forming a void immediately above said rotary member to facilitate the access of air to the surface of said rotary member.

7. An attrition mill comprising a rotary member having a flour-producing abrasive surface, a receptacle forming with said rotary member a chamber receiving material to be ground, there being a constricted slit-like orifice between portions of said receptacle and said rotary member for discharge of floured material, a casing enclosing said rotary member and having a discharge opening, and a sheet metal plate rotatable with said rotary member and having laterally-extending terminal portions forming fan blades for assisting the withdrawal of floured material through said orifice.

In testimony whereof I affix my signature.

ROYAL LEE.